(12) United States Patent
Wilkinson

(10) Patent No.: US 12,076,671 B2
(45) Date of Patent: Sep. 3, 2024

(54) FILTER ARRANGEMENT INCLUDING PREFILTRATION FILTER ELEMENT AND FILTER DEVICE

(71) Applicant: CYTIVA US LLC, Marlborough, MA (US)

(72) Inventor: Timothy J. Wilkinson, Fareham (GB)

(73) Assignee: CYTIVA US LLC, Marlborough, MA (US)

( * ) Notice: Subject to any disclaimer, the term of this patent is extended or adjusted under 35 U.S.C. 154(b) by 846 days.

(21) Appl. No.: 16/909,239

(22) Filed: Jun. 23, 2020

(65) Prior Publication Data

US 2021/0394094 A1    Dec. 23, 2021

(51) Int. Cl.
| | | |
|---|---|---|
| *B01D 35/04* | (2006.01) | |
| *B05B 15/40* | (2018.01) | |
| *B05B 1/18* | (2006.01) | |
| *E03C 1/04* | (2006.01) | |

(52) U.S. Cl.
CPC .............. *B01D 35/04* (2013.01); *B05B 15/40* (2018.02); *B05B 1/18* (2013.01); *E03C 1/0404* (2013.01)

(58) Field of Classification Search
CPC ........ B01D 35/04; B01D 29/13; B01D 29/15; B01D 29/21; B01D 29/58; B01D 35/02; B01D 29/33; B01D 35/30; B01D 46/0001; B01D 46/0004; B01D 46/2411; B05B 15/40; B05B 1/18; E03C 1/0404; A47K 3/281
See application file for complete search history.

(56) References Cited

U.S. PATENT DOCUMENTS

| | | | | |
|---|---|---|---|---|
| 5,328,609 | A | * | 7/1994 | Magnusson ............. C02F 1/003 210/295 |
| 5,415,676 | A | | 5/1995 | Tokar et al. |
| 5,935,426 | A | * | 8/1999 | Giordano ................ C02F 1/003 210/138 |
| 5,980,759 | A | | 11/1999 | Proulx et al. |
| 6,267,887 | B1 | * | 7/2001 | Hughes ................... C02F 1/003 210/443 |
| 7,087,166 | B1 | | 8/2006 | Sudo et al. |
| 8,323,384 | B2 | | 12/2012 | Derstler et al. |
| 9,745,206 | B2 | | 8/2017 | Hunter et al. |
| 2003/0205518 | A1 | | 11/2003 | VanderKooi et al. |

(Continued)

FOREIGN PATENT DOCUMENTS

| | | |
|---|---|---|
| CN | 1652858 A | 8/2005 |
| CN | 206996887 U | 2/2018 |

(Continued)

OTHER PUBLICATIONS

Singapore Intellectual Property Office, Search Report in counterpart Singapore Patent Application No. 10202106781R, mailed on Aug. 8, 2022.

(Continued)

*Primary Examiner* — Qingzhang Zhou
(74) *Attorney, Agent, or Firm* — Leydig, Voit & Mayer, Ltd.

(57) ABSTRACT

A filter arrangement including a host filter and a prefiltration filter element, a filter device including the filter arrangement, and a method of processing fluid by passing it through the filter arrangement, are disclosed.

2 Claims, 10 Drawing Sheets

(56) References Cited

U.S. PATENT DOCUMENTS

Figure 2A:
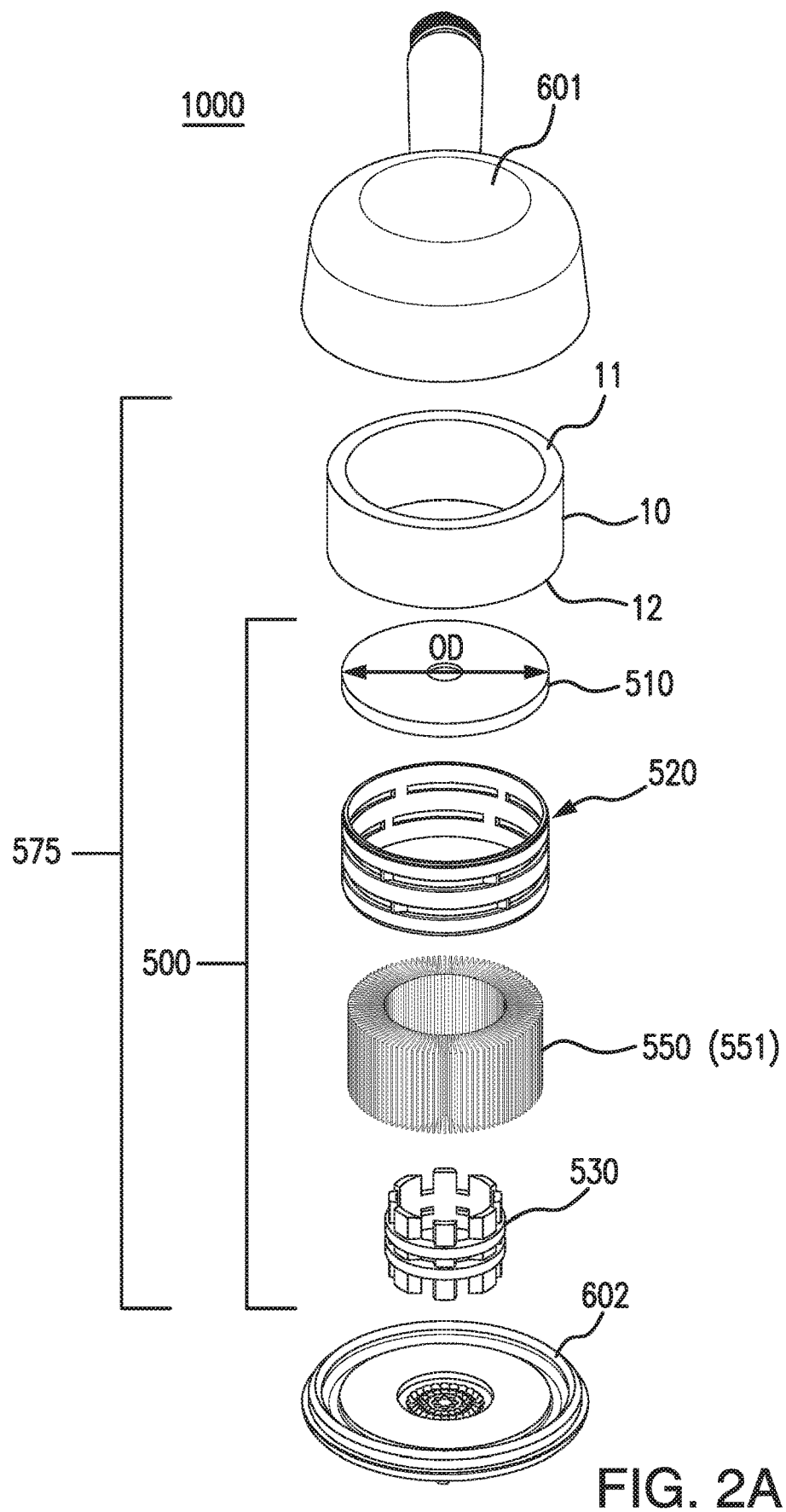

| | | | | |
|---|---|---|---|---|
| 2004/0055939 A1* | 3/2004 | Wybo | ................... | B01D 29/07 |
| | | | | 210/338 |
| 2012/0055886 A1* | 3/2012 | Hunter | ................ | B01D 35/153 |
| | | | | 210/85 |
| 2012/0055888 A1 | 3/2012 | Hunter et al. | | |

FOREIGN PATENT DOCUMENTS

| | | |
|---|---|---|
| DE | 1 536 922 A1 | 2/1970 |
| DE | 10 2011 010 667 A1 | 8/2012 |
| DE | 20 2017 107 401 U1 | 2/2018 |
| EP | 1747811 B1 | 8/2009 |
| GB | 1057317 A | 2/1967 |
| GB | 1124735 A | 8/1968 |
| GB | 2 261 830 A | 6/1993 |
| JP | S63-175685 A | 7/1988 |
| JP | H7-213814 A | 8/1995 |
| JP | 2003-38916 A | 2/2003 |
| JP | 2004-956 A | 1/2004 |
| JP | 2005-524525 A | 8/2005 |
| KR | 10-2016-0055751 A | 5/2016 |
| WO | WO 03/095066 A1 | 11/2003 |
| WO | WO 2012/107260 A1 | 8/2012 |

OTHER PUBLICATIONS

Chinese National Intellectual Property Administration, Office Action in counterpart Chinese Patent Application No. 202110695213.0, mailed on Jul. 29, 2022.

Korean Intellectual Property Office, Office Action issued in counterpart Korean Patent Application No. 10-2021-0081642, mailed on Aug. 9, 2022.

European Patent Office, Extended European Search Report in counterpart European Patent Application No. 21180709.4, mailed on Oct. 13, 2021.

Japanese Patent Office, Office Action in counterpart Japanese Patent Application No. P2021-103209, mailed on Apr. 26, 2022.

* cited by examiner

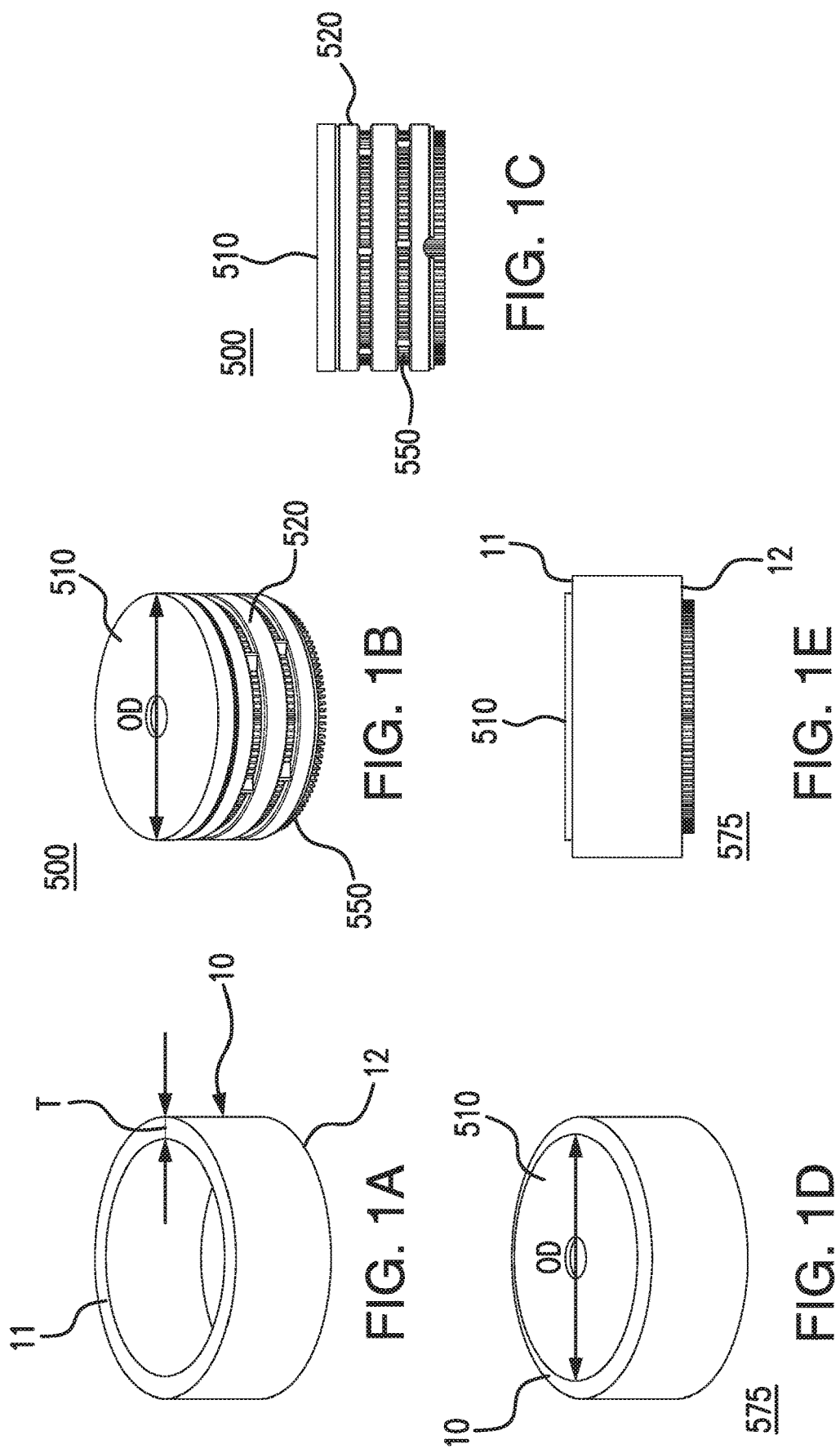

FILTER ARRANGEMENT INCLUDING PREFILTRATION FILTER ELEMENT AND FILTER DEVICE

BACKGROUND OF THE INVENTION

Porous filters can be rated by their dirt holding capacity, and can be discarded as they approach, or reach, that capacity. In some situations, the filter device containing the porous filter is also discarded. While the dirt holding capacity may be increased by increasing the amount of filter material and/or changing the filter configuration, this may result in increased cost and/or may result in an undesirably large footprint for the filter device.

The present invention provides for ameliorating at least some of the disadvantages of the prior art. These and other advantages of the present invention will be apparent from the description as set forth below.

BRIEF SUMMARY OF THE INVENTION

An embodiment of the invention provides a filter arrangement comprising a host filter comprising (a) a hollow cylindrical porous host filter element having a first end and a second end; (b) a first end cap arranged at the first end or the second end of the hollow cylindrical porous host filter element, the first end cap having an outer diameter; and, (c) an outer surface; the filter arrangement further comprising (d) a porous fibrous hollow cylindrical prefiltration element compression fit on the outer diameter of the first end cap, and covering the exposed outer surface of the host filter.

A filter device according to another embodiment of the invention comprises an embodiment of the filter arrangement located in a housing having an inlet and an outlet and defining a fluid flow path between the inlet and the outlet, wherein the filter arrangement is arranged in the housing across the fluid flow path, such that undesirable material is removed from fluid as the fluid passes through the filter device. Preferably, the filter device comprises a point of use shower head device or a point of use faucet head device, and the host filter comprises a sterilizing grade water filter.

In another embodiment, a method of producing a filter arrangement is provided, the method comprising compression fitting a porous fibrous hollow cylindrical prefiltration element over a host filter comprising (a) a hollow cylindrical porous host filter element having a first end and a second end; (b) a first end cap arranged at the first end or the second end of the hollow cylindrical porous host filter element, the first end cap having an outer diameter; and, (c) an outer surface; such that the prefiltration element is compression fit on the outer diameter of the first end cap, and covers the exposed outer surface of the host filter.

An embodiment of processing fluid according to an embodiment of the invention comprising passing fluid through a filter arrangement comprising a porous fibrous hollow cylindrical prefiltration element and a host filter, wherein the porous fibrous hollow cylindrical prefiltration element is compression fitted on the host filter, and removing undesirable material from fluid as the fluid passes through the fluid arrangement. Preferred embodiments of the method comprise passing water through a point of use shower head device or a point of use faucet head device, wherein the host filter comprises a sterilizing grade water filter, and dispensing sterile water from the device.

BRIEF DESCRIPTION OF THE SEVERAL VIEWS OF THE DRAWING(S)

FIG. 1A shows a top isometric view of a prefiltration filter element according to an embodiment of the invention; FIG. 1B shows a top isometric view of an assembled host filter, including a top end cap and an outer cage surrounding the host filter; FIG. 1C shows a side view of the assembled host filter shown in FIG. 1B; FIG. 1D shows a top isometric view of filter arrangement comprising prefiltration filter element shown in FIG. 1A compress fitted over the top end cap of the host filter as shown in FIG. 1B; and FIG. 1E shows a side view of the filter arrangement shown in FIG. 1D.

Figure 2B:
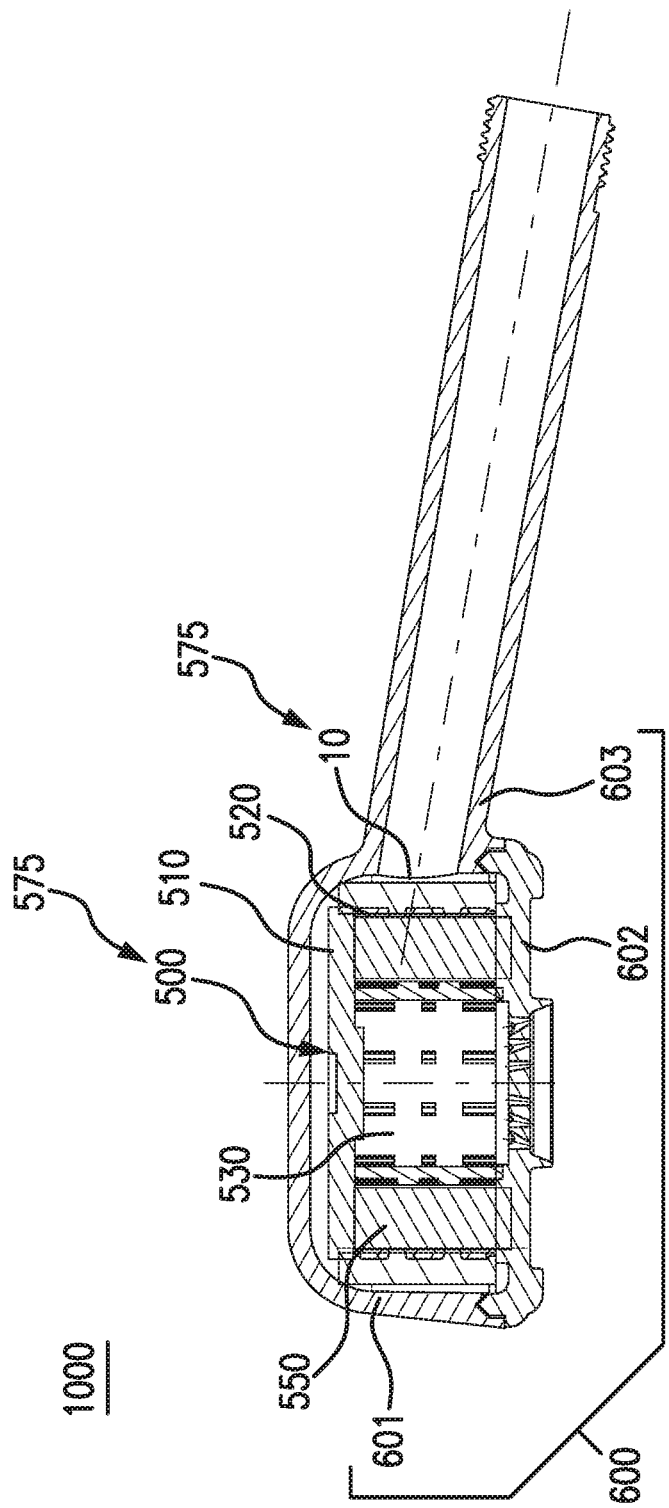
Figure 2C:
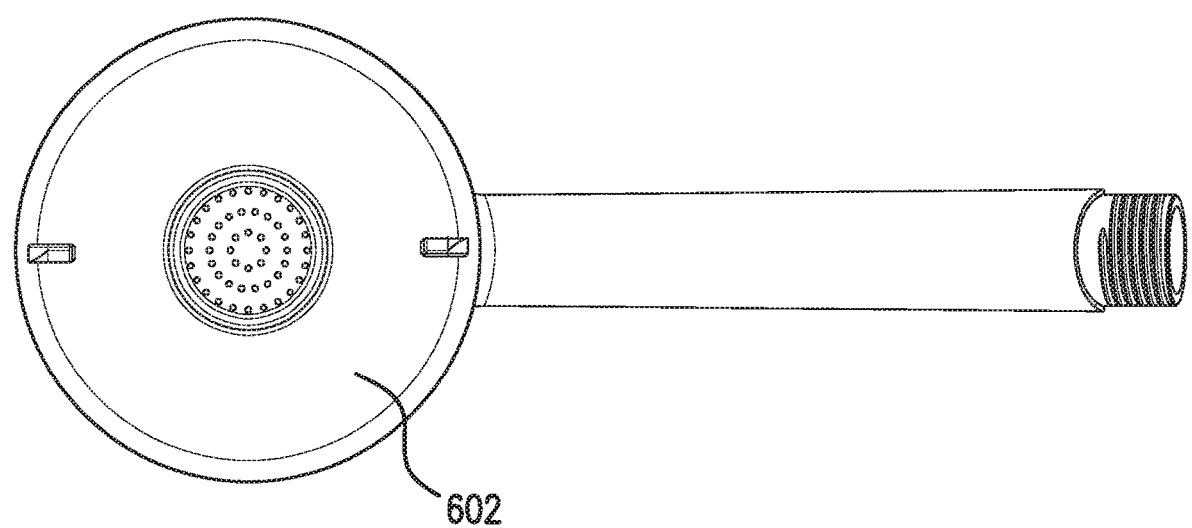

FIG. 2A is an exploded top isometric view of a showerhead filter device comprising a filter arrangement comprising a prefiltration filter element that can be compress fit over a host filter (comprising a host filter element between an inner core and an outer cage, and a top end cap sealed to the outer cage and the filter element and the inner core) arranged in a filter housing according to an embodiment of the invention, FIG. 2B is a side cross section view of the assembled filter arrangement; and FIG. 2C is a bottom view of the filter device shown in FIG. 2A.

Figure 3A:
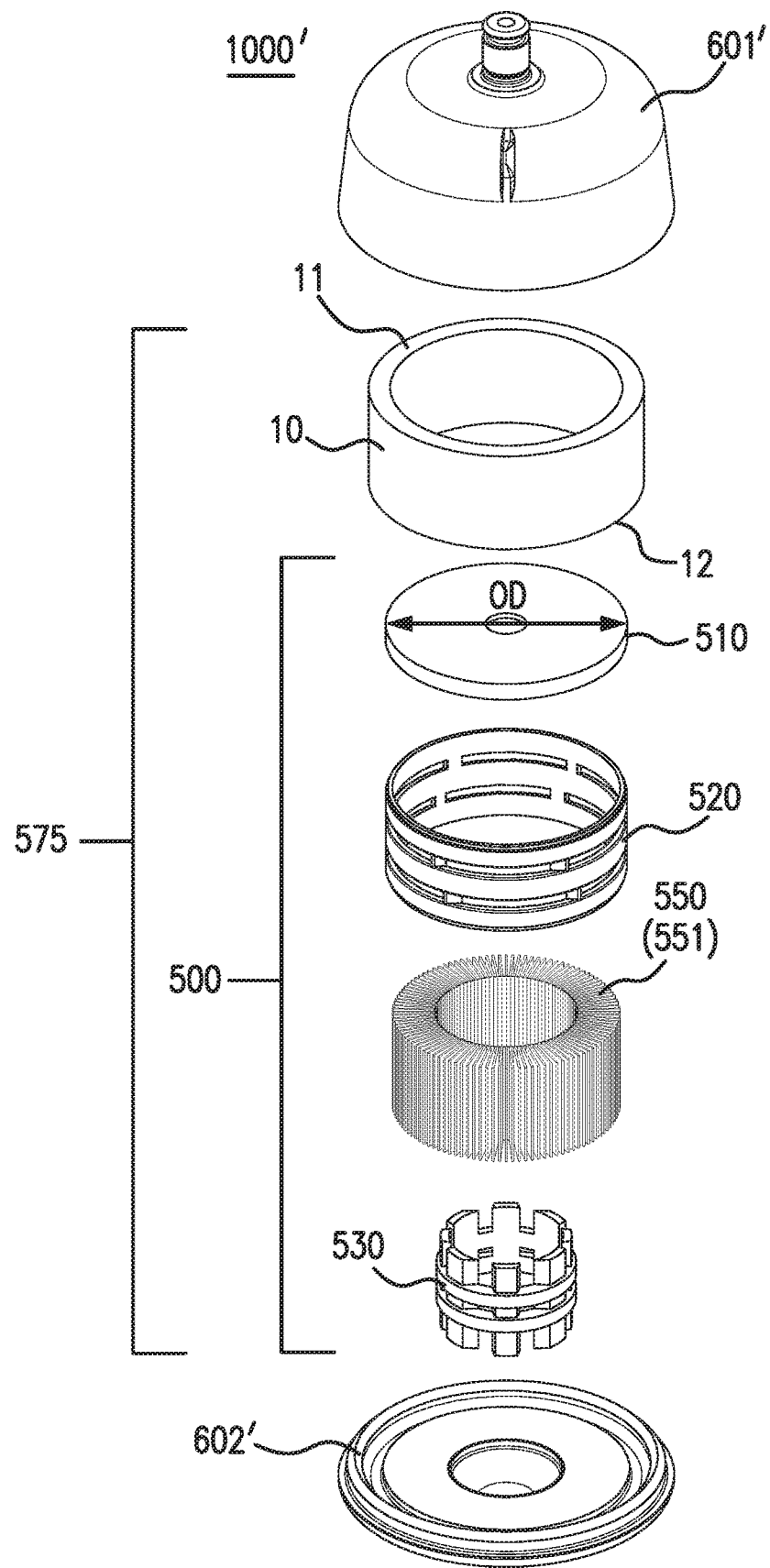
Figure 3B:
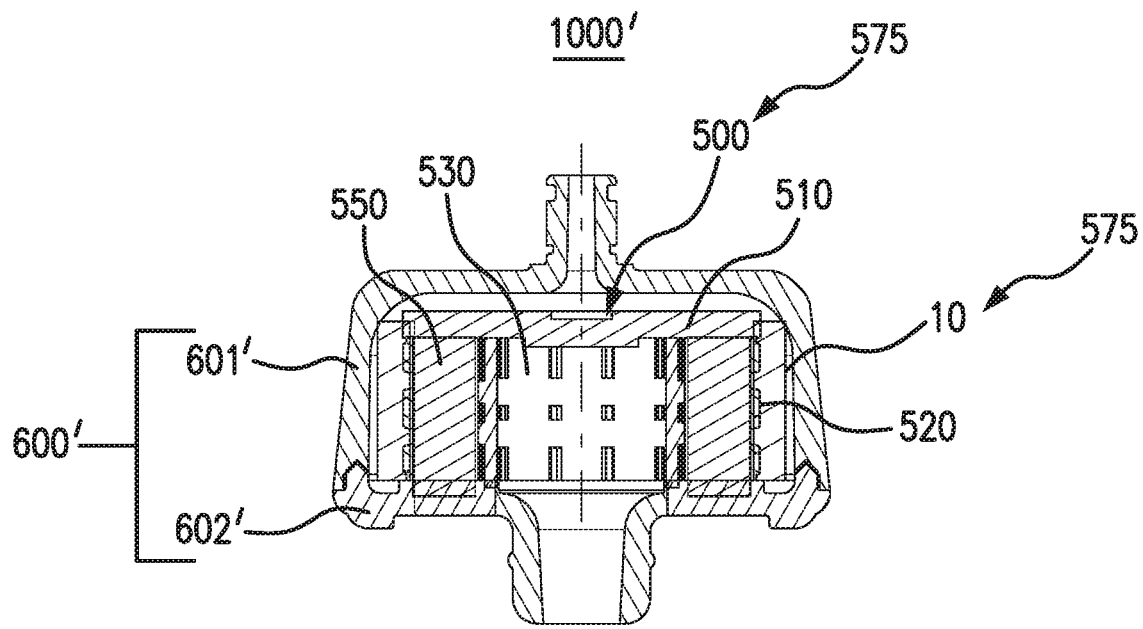
Figure 3C:
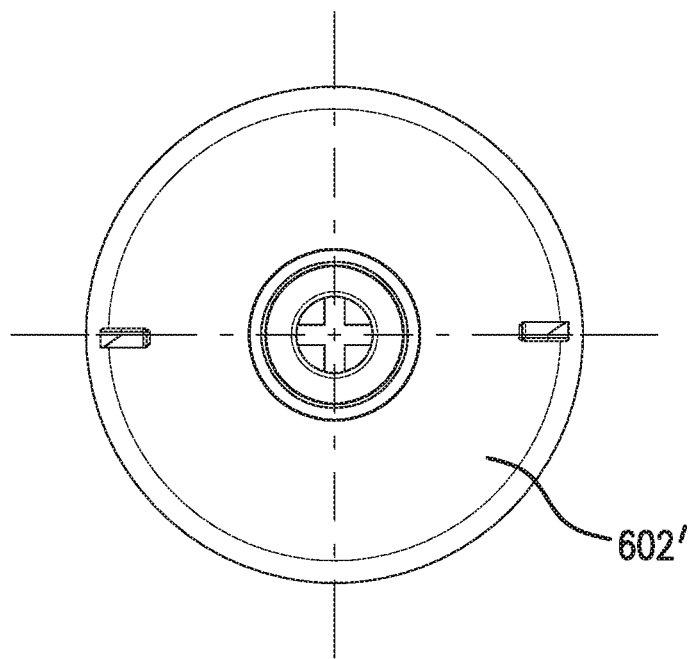

FIG. 3A is an exploded top isometric view of a faucet head filter device comprising a filter arrangement comprising a prefiltration filter element that can be compress fit over a host filter (comprising a host filter element between an inner core and an outer cage, and a top end cap sealed to the outer cage and the filter element and inner core) arranged in a filter housing according to an embodiment of the invention, FIG. 3B is a side cross section view of the assembled filter arrangement, and FIG. 3C is a bottom view of the filter device shown in FIG. 3A.

Figure 4A:
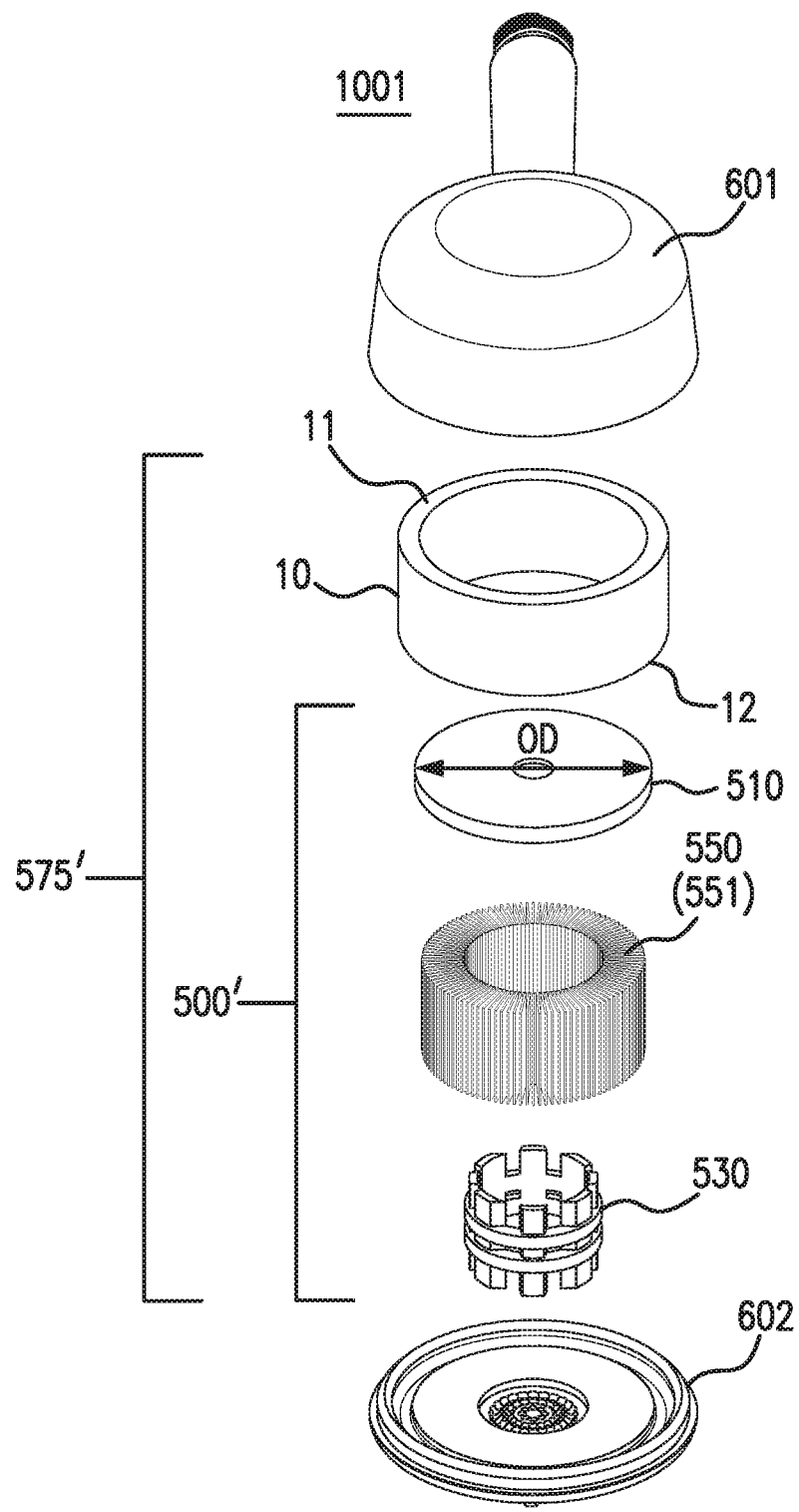
Figure 4B:
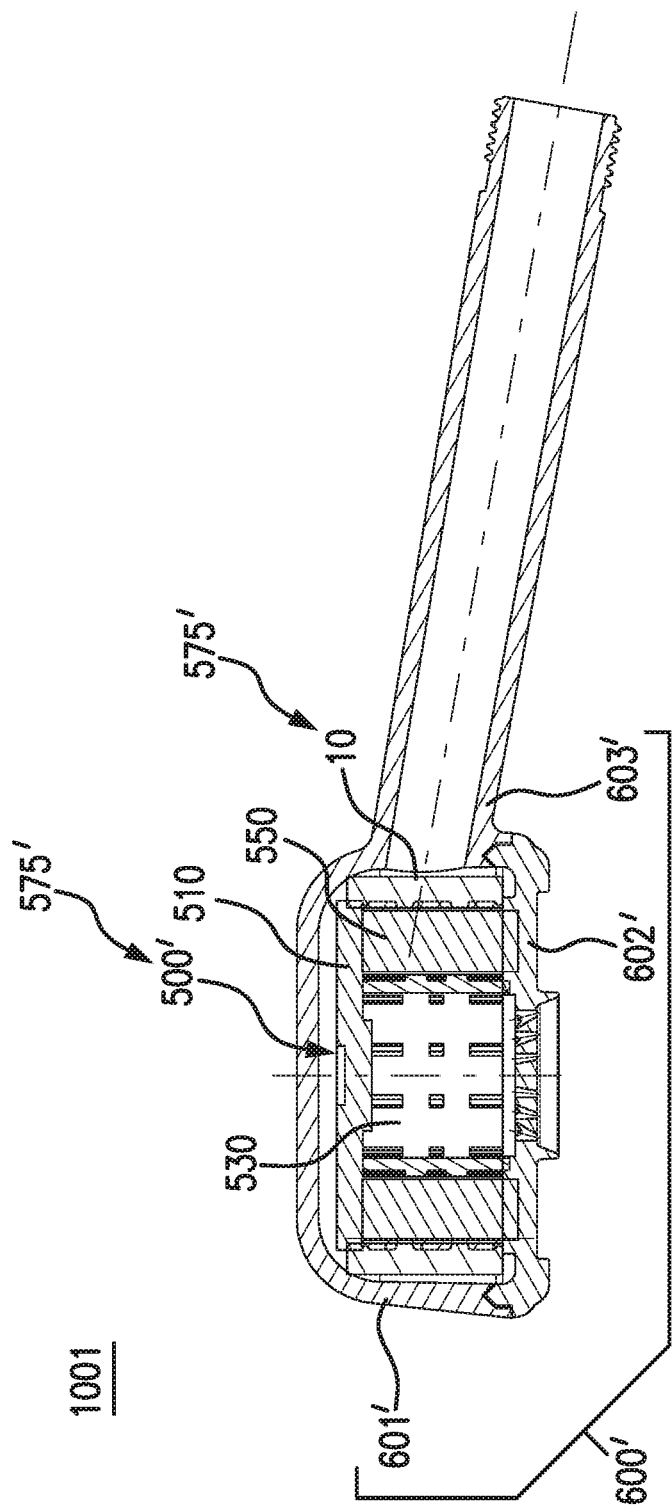

FIG. 4A is an exploded top isometric view of a showerhead filter device comprising a filter arrangement comprising a prefiltration filter element that can be compress fit over a host filter (comprising a host filter element between having an inner core, and a top end cap sealed to the filter element and the inner core) arranged in a filter housing according to another embodiment of the invention, and FIG. 4B is a side cross section view of the assembled filter arrangement.

Figure 5A:
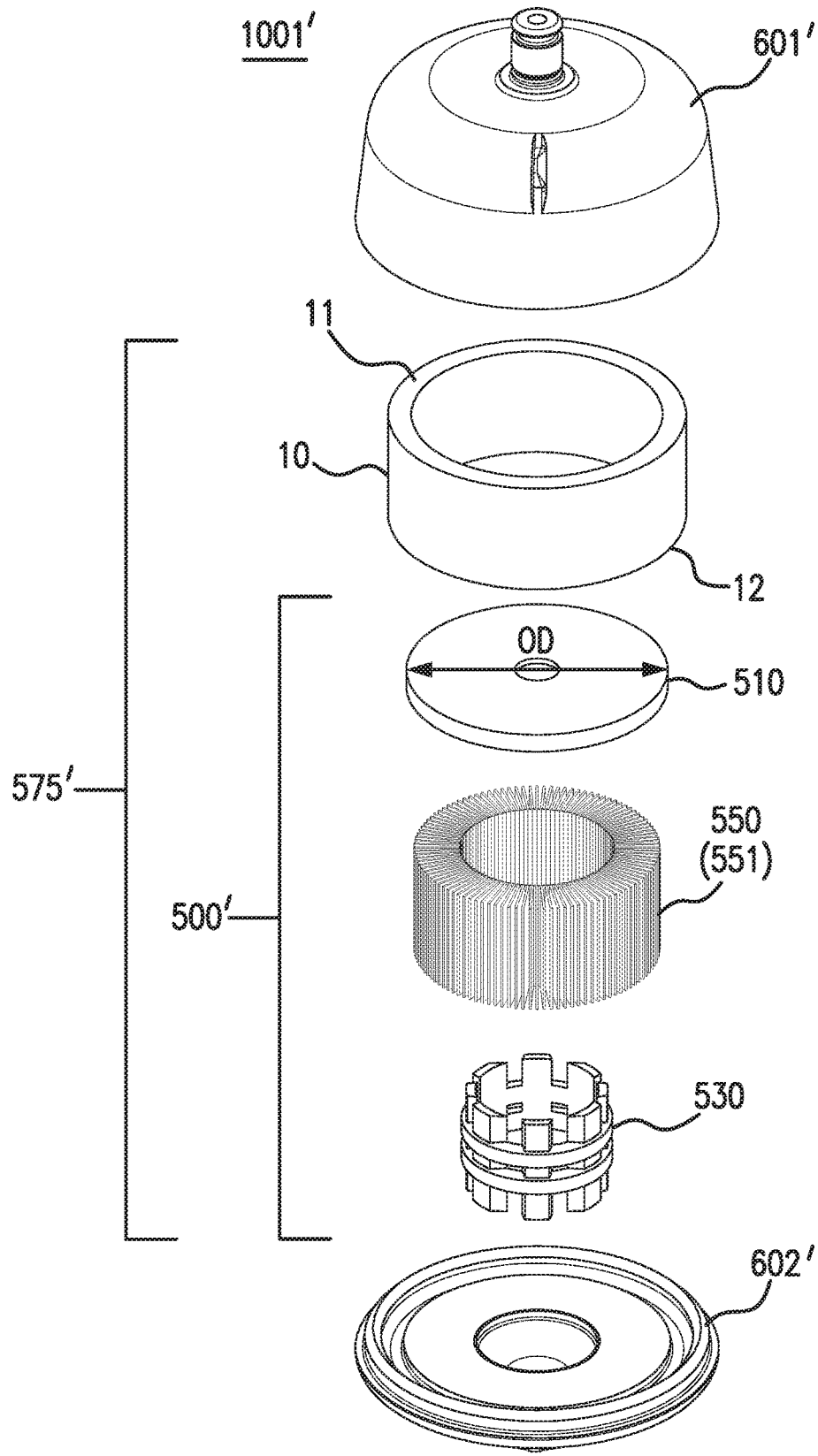
Figure 5B:
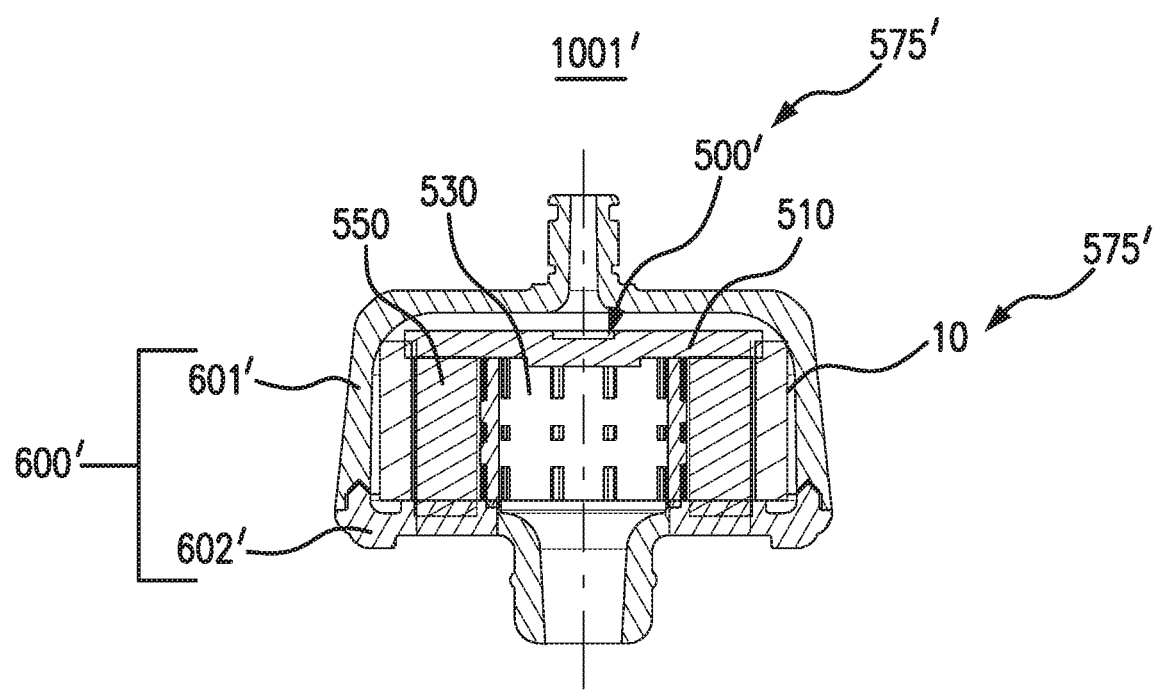

FIG. 5A is an exploded top isometric view of a faucet head filter device comprising a filter arrangement comprising a prefiltration filter element that can be compress fit over a host filter (comprising a host filter element between having an inner core, and a top end cap sealed to the filter element and the inner core) arranged in a filter housing according to another embodiment of the invention, and FIG. 5B is a side cross section view of the assembled filter arrangement.

DETAILED DESCRIPTION OF THE INVENTION

In accordance with an embodiment of the invention, a filter arrangement is provided comprising a host filter comprising (a) a hollow cylindrical porous host filter element having a first end and a second end; (b) a first end cap arranged at the first end or the second end of the hollow cylindrical porous host filter element, the first end cap having an outer diameter; and, (c) an outer surface; the filter arrangement further comprising (d) a porous fibrous hollow cylindrical prefiltration element compression fit on the outer diameter of the first end cap, and covering the exposed outer surface of the host filter.

In some embodiments, the prefiltration filter element covers the outer surface of an outer cage of the host filter. In other embodiments, the prefiltration filter element covers the upstream surface of the hollow cylindrical porous host filter element.

In an embodiment of the filter arrangement, the host filter includes an outer cage surrounding the hollow cylindrical porous host filter element, the outer cage having an external surface providing the outer surface of the host filter. In another embodiment of the filter device, the hollow cylindrical porous host filter element has an upstream surface providing the outer surface of the host filter.

A filter device according to an embodiment of the invention comprises an embodiment of the filter arrangement located in a housing having an inlet and an outlet and defining a fluid flow path between the inlet and the outlet, wherein the filter arrangement is arranged in the housing across the fluid flow path, such that undesirable material is removed from fluid as the fluid passes through the filter device. Preferably, the filter device comprises a point of use shower head device or a point of use faucet head device, and the host filter comprises a sterilizing grade water filter.

In another embodiment, a method of producing a filter arrangement is provided, the method comprising compression fitting a porous fibrous hollow cylindrical prefiltration element over a host filter comprising (a) a hollow cylindrical porous host filter element having a first end and a second end; (b) a first end cap arranged at the first end or the second end of the hollow cylindrical porous host filter element, the first end cap having an outer diameter; and, (c) an outer surface; such that the prefiltration element is compression fit on the outer diameter of the first end cap, and covers the exposed outer surface of the host filter.

An embodiment of processing fluid according to an embodiment of the invention comprising passing fluid through a filter arrangement comprising a porous fibrous hollow cylindrical prefiltration element and a host filter, wherein the porous fibrous hollow cylindrical prefiltration element is compression fitted on the host filter, and removing undesirable material from fluid as the fluid passes through the fluid arrangement. Preferred embodiments of the method comprise passing water through a point of use shower head device or a point of use faucet head device, wherein the host filter comprises a sterilizing grade water filter, and dispensing sterile water from the device.

Advantageously, the use of a prefiltration filter element can increase the life and/or dirt holding capacity of the host filter. Moreover, the prefiltration filter element can be produced and used at a fraction of the cost of the host filter, and may increase the filter life to blockage by several fold with little effect on the pressure drop across the prefiltration filter element and host filter.

Prefiltration filter elements, which comprise porous fibrous hollow cylindrical elements, can be produced by a variety of processes, including meltblowing. They can comprise woven or nonwoven material.

If desired, the prefiltration filter element can include multiple layers of different fiber diameters and/or densities and/or pore structures that provide different filtration efficiencies.

Prefiltration filter elements can be used with filters with and without outer cages, fully covering the exposed upstream area or surface area of the host filter or host filter outer cage such that there is no bypassing of the host filter.

In accordance with embodiments of the invention, the prefiltration filter element can be used with a variety of porous hollow cylindrical host filters and porous hollow cylindrical host filter elements (especially porous fibrous hollow cylindrical host filters and host filter elements) and filter devices including such filters and filter elements. One example of a suitable filter and filter device is disclosed in U.S. Pat. No. 9,745,206.

Each of the components of the invention will now be described in more detail below, wherein like components have like reference numbers.

FIG. 1A shows an embodiment of a prefiltration filter element 10 comprising a porous fibrous hollow cylindrical element for use with a host filter, the prefiltration filter element having a first end 10, a second end 11, and a thickness T.

FIGS. 1B, 1C, 2A, 2B, 3A and 3B show an illustrative host filter 500. Using FIGS. 2A and 3A for reference, an illustrative host filter 500 comprises a first end cap 510 (having an outer diameter OD), an outer cage 520 having an outer surface, an inner core 530, and a porous fibrous hollow cylindrical host filter 550 comprising a porous fibrous hollow cylindrical host filter element 551. While the host filter illustrated in FIGS. 1B, 1C, 2A, 2B, 3A and 3B includes an outer cage and an inner core, the cage and core are optional, and the host filter can include either an outer cage or an inner core, or can lack both an outer cage and an inner core.

FIG. 1B shows an isometric view, and FIG. 1C shows a side view, of the host filter 500 without the prefiltration element 10, and FIG. 1D shows an isometric view, and FIG. 1E shows a side view, of an embodiment of the filter arrangement 575, wherein the prefiltration filter element 10 is compression fit over the filter (i.e., compression fit over the OD of first end cap 510), and covering the exposed outer surface of the outer cage 520, such that there is no bypassing of the host filter during use.

Thus, with respect to the filter device housing, FIGS. 2A-2C show an illustrative showerhead filter device 1000 comprising a filter device housing 600 receiving the filter arrangement 575, the housing having a hollow handle 603 including a device housing inlet wherein fluid enters the device, a first portion 601, and a second portion 602 including the device outlet, wherein the housing defines a fluid flow path between the inlet and the outlet with the filter arrangement across the fluid flow path.

FIGS. 3A-3C show an illustrative faucet head filter device 1000' comprising a filter device housing 600' receiving the filter arrangement 575, the housing having a first portion 601' including the device housing fluid inlet and a second portion 602' including the device housing outlet, wherein the housing defines a fluid flow path between the inlet and the outlet with the filter arrangement across the fluid flow path.

As noted above, the host filter can include either an outer cage or an inner core, or can lack both an outer cage and an inner core. For example, FIGS. 4A, 4B, 5A, and 5B show another host filter 500' similar to the host filter 500, but without an outer cage. Thus, illustrated host filter 500' comprises a first end cap 510 (having an outer diameter OD), and an inner core 530, and a porous fibrous hollow cylindrical host filter 550 comprising a porous fibrous hollow cylindrical host filter element 551, and the filter arrangement 575' comprises the host filter 500' and the prefiltration element 10.

FIGS. 4A-4B show another illustrative showerhead filter device 1001 comprising a filter device housing 600 receiving the filter arrangement 575', the housing having a hollow handle 603 including a device housing inlet wherein fluid enters the device, a first portion 601, and a second portion 602 including the device outlet, wherein the housing defines a fluid flow path between the inlet and the outlet with the filter arrangement across the fluid flow path.

FIGS. 5A-5B show another illustrative faucet head filter device 1001' comprising a filter device housing 600' receiving the filter arrangement 575', the housing having a first portion 601' including a fluid inlet wherein fluid enters the device, and a second portion 602' including the device outlet, wherein the housing defines a fluid flow path between the inlet and the outlet with the filter arrangement across the fluid flow path.

A prefiltration filter element can have any suitable pore structure as long as it does not significantly affect the liquid flow (e.g., water flow) characteristics of the host filter (which can also have any suitable pore structure). Typically, the pore structure of the prefiltration element, e.g., a pore size (for example, as evidenced by bubble point, or by KL as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element, is larger than that of the host filter.

The host filter can include additional elements, layers, or components, that can have different structures and/or functions, e.g., at least one of any one or more of the following: support, drainage, spacing and cushioning. Illustratively, the host filter can also include at least one additional element such as a mesh and/or a screen.

Typically, prefiltration elements are slightly flexible and slightly stretchable to provide a desired interference fit, with compression, such that the ends of the prefiltration elements do not need to be sealed or bonded to the host filter. If desired, temporary tooling (such as, but not limited to, a guide dolly) can be used as a lead-in to assist the slide over the widest part of the host filter.

The host filter and prefiltration filter element are typically disposed in a housing comprising at least one inlet and at least one outlet and defining at least one fluid flow path between the inlet and the outlet, wherein the filter and prefiltration filter element is across the fluid flow path, to provide a filter device. Preferably, the filter device and filter arrangement are sterilizable. Any housing of suitable shape and providing at least one inlet and at least one outlet may be employed.

The housing can be fabricated from any suitable rigid impervious material, including any impervious thermoplastic material, which is compatible with the fluid being processed. For example, the housing can be fabricated from a metal, such as stainless steel, or from a polymer. In a preferred embodiment, the housing is a polymer, such as an acrylic, polypropylene, polystyrene, or a polycarbonated resin.

The following example(s) further illustrate the invention but, of course, should not be construed as in any way limiting its scope.

EXAMPLE

This example demonstrates the improved result using a prefiltration filter element with a host filter compared to the host filter without the prefiltration filter element.

Host filters comprising porous fibrous hollow cylindrical filter elements with end caps, outer cases and inner cores; and filter housings, are produced as generally described in U.S. Pat. No. 9,745,206. The host filters are arranged on filter device housing portions including the filter device outlets.

Prefiltration filter elements are produced by melt-blowing, cut to length, and compress fit over the widest diameter (the upper endcap) of the host filter by sliding the prefiltration element over a guide dolly on top of the host filter, and subsequently removing the guide dolly. The prefiltration filter elements fully cover the exposed upstream area or surface area of the host filter (i.e., covering the exposed upstream area of the outer cages) such that there is no bypassing of the host filter.

The thickness of the prefiltration filter element (about 5 mm) does not exceed any constraints of the housing into which the host filter fits or is encapsulated into. No additional sealing, bonding, or retaining (e.g., adhesive, melting, or clips) is utilized. The housing does not contact the outer surface of the prefiltration element.

The porosity of the prefiltration filter element is greater than that of the host filter.

After dust loading, about a 5-10% flow loss is observed in filter devices including prefiltration filter elements, in contrast with about a 50% loss in the controls.

Additionally, filter devices including prefiltration filter elements exhibit over twice the throughput over controls to the same degree of blockage (clean vs. end of life flowrate at a fixed inlet pressure).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter device comprising a point of use shower head device or a point of use faucet head device comprising a housing having an inlet and an outlet and defining a fluid flow path between the inlet and the outlet, and a filter arrangement comprising a host filter comprising a sterilizing grade water filter comprising (a) a hollow cylindrical porous host filter element having a first end and a second end; (b) a first end cap arranged at the first end or the second end of the hollow cylindrical porous host filter element, the first end cap having an outer diameter; and, (c) an outer surface; and, (d) a porous fibrous hollow cylindrical prefiltration element compression fit on the outer diameter of the first end cap, and covering exposed outer surface of the host filter, wherein the filter arrangement is arranged across the fluid flow path.

2. A method of processing fluid, the method comprising passing fluid through the filter device of claim 1, and dispensing sterile water from the filter device.

\* \* \* \* \*